Nov. 7, 1961  D. B. PALL  3,007,238
METHOD OF MAKING A FILTER ASSEMBLY
Filed Nov. 30, 1956  3 Sheets-Sheet 1

INVENTOR.
DAVID B. PALL
BY
Campbell, Brumbaugh, Free & Graves
ATTORNEYS

Nov. 7, 1961
D. B. PALL
3,007,238
METHOD OF MAKING A FILTER ASSEMBLY
Filed Nov. 30, 1956
3 Sheets—Sheet 2
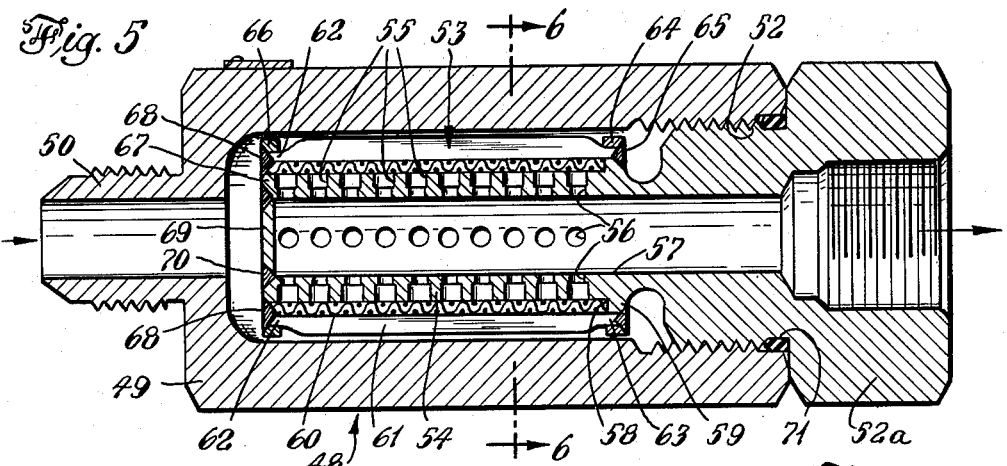
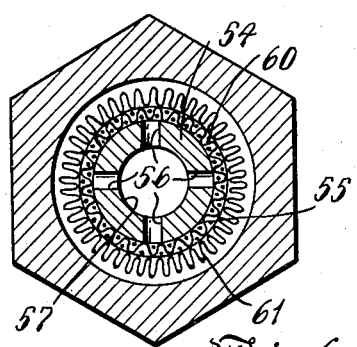
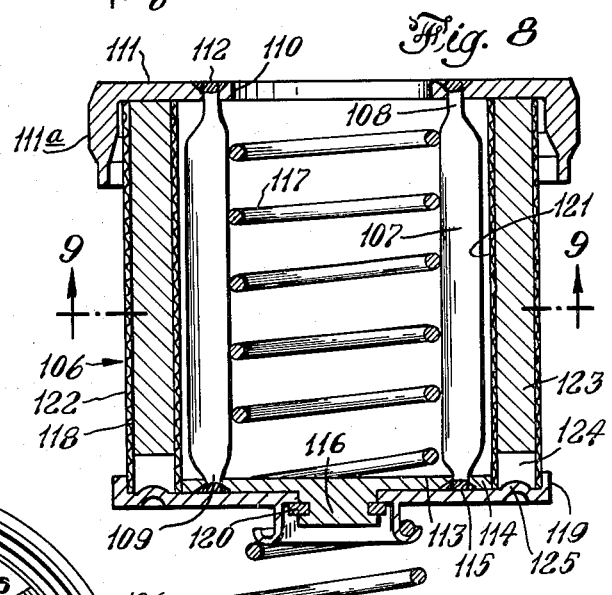
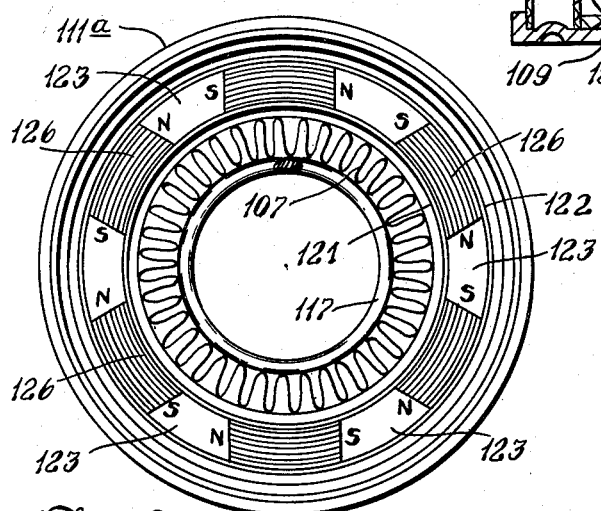
INVENTOR.
DAVID B. PALL
BY
Campbell, Brumbaugh, Free & Graves
ATTORNEYS

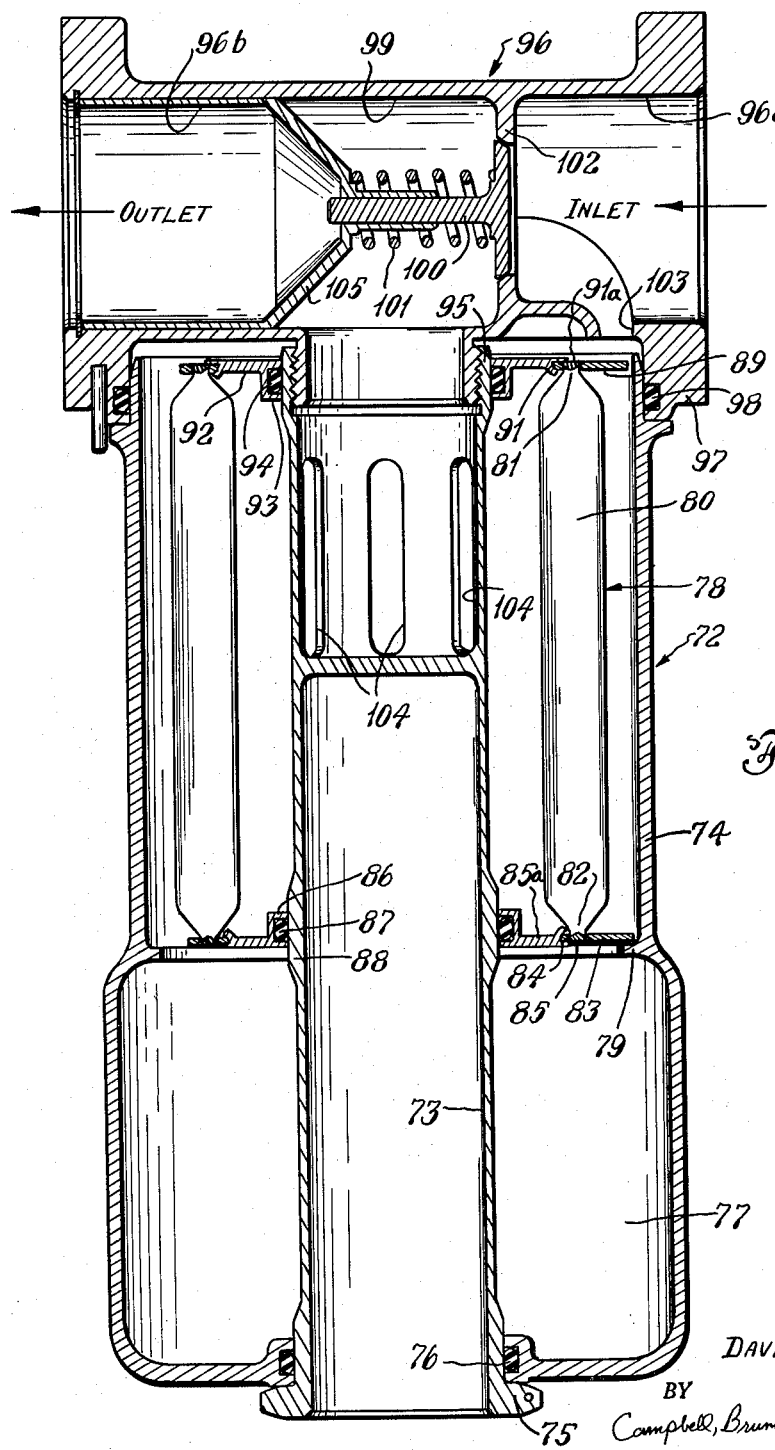

United States Patent Office 3,007,238
Patented Nov. 7, 1961

3,007,238
METHOD OF MAKING A FILTER ASSEMBLY
David B. Pall, Roslyn Heights, N.Y., assignor, by mesne assignments, to Pall Corporation, a corporation of New York
Filed Nov. 30, 1956, Ser. No. 625,445
5 Claims. (Cl. 29—163.5)

This invention relates to a method of making filters and more particularly to a method of making filter assemblies in which the filter element is based on a wire mesh construction and is integrated both physically and functionally with its companion parts in the filter assembly.

Filter assemblies using wire mesh filter elements, particularly of the corrugated type, characteristically utilize frictional clamping, resinous bonds, or both, as the juncture between the filter element and the rest of the assembly. In many cases, the clamping action is augmented by the use of rubber gaskets. Direct frictional clamping is unsatisfactory, particularly in the high pressure installations, because it is unpredictable in its behavior under the random stresses applied in use and there is a tendency for leakage paths to occur which exceed the pore size of the basic filter element. Resinous bonds are structurally weak and incapable of withstanding the high temperatures which occur in many present day applications such, for example, as in high speed airborne equipment. Gaskets formed of rubber or the like require continuous compression to maintain their effectiveness, therefore making locked-in stresses essential. Also, such gasket materials are in general incapable of withstanding heat over extended intervals without loss of sealing efficiency.

In accordance with the present invention, therefore, there are provided filter assemblies in which filter elements, preferably of corrugated wire mesh, are joined to the other parts of the filter assembly in a stress-free, liquid-tight joint so constituted that the filter element itself can impart structural rigidity to the assembly, transmitting forces of both tension and compression as might be imposed on the assembly in use. In one preferred arrangement, a wire mesh sheet is corrugated and bent into a tubular configuration to be sealed against itself by welding. The ends of the tubular configuration are compressed to form uniformly dense margins which are fitted between radially opposed surfaces as provided, for example, by a pair of concentric rings after which a metal weld is applied either by melting existing metal in the area of the joints or by the addition of metal, or both. The completed joint is stress-free in that there are no compression forces between the opposed surfaces of the rings which embrace the densified margins of the filter element and the joints can be made fully liquid-tight against leakage even under applied pressures of extreme magnitude. The filter element thus becomes a structural coupling both between opposite ends of the unit and between the assembled parts at each end of the unit. The basic integrated structure can be modified in various ways to accommodate various design requirements. Thus, for example, either the outer or inner ring part which make up the joint at one end of the tubular filter element can be formed integrally with various coupling elements, supplementary support elements, relief valve assemblies, or the like.

Representative embodiments of the invention from which the above and other features and objects will be readily apparent are described below having reference to the accompanying drawings in which:

FIGURE 5 is a view in longitudinal section of a filter assembly of the in-line type adapted to withstand extremely high pressures and temperatures;

FIGURE 6 is a view in transverse section taken on the line 6—6 of FIGURE 5 looking in the direction of the arrows;

FIGURE 7 is a view in longitudinal section of a typical fuel filter assembly including sumps and relief valve means and in which a filter element with integrated end fittings is locked in position;

FIGURE 8 is a view in longitudinal section of a filter assembly in which the filtering action of the basic corrugated wire mesh element is augmented by magnetic filters;

FIGURE 9 is a view in transverse section taken on the line 9—9 of FIGURE 8 looking in the direction of the arrows; and FIGURE 9B is an enlarged, fragmentary view showing a portion of the magnetic filter of FIGURE 9.

Figure 1:
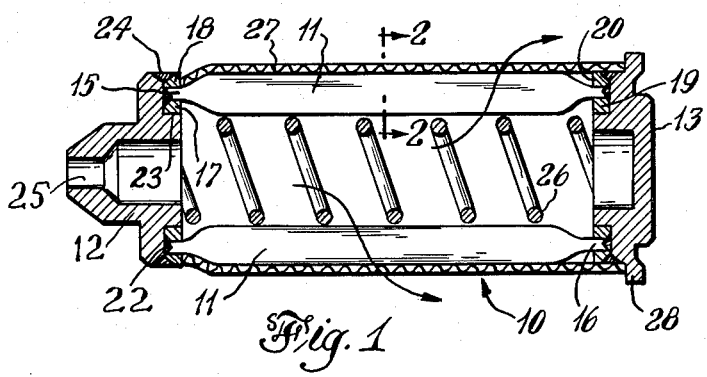
FIGURE 1 is a view in longitudinal section of a filter assembly in which the filter elements themselves form the structural connection between the fittings secured to the ends.
Figure 2:
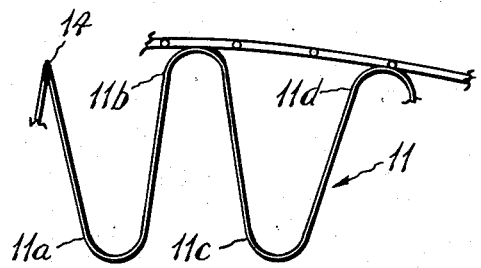
FIGURE 2 is an enlarged fragmentary view in transverse section taken on the line 2—2 of FIGURE 1 looking in the direction of the arrows.

Referring first to FIGURES 1 and 2, the invention is illustrated as embodied in a filter assembly 10 which is adapted to be mounted as a unit in a hydraulic system such, for example, as a fuel system, a hydraulic servo system, or the like, and which includes a basic filter element 11 in tubular form and having joined permanently to its respective ends, end fittings 12 and 13. The filter element 11 is constituted basically of a woven wire mesh sheet, preferably made in accordance with the disclosure of the copending application, Serial No. 562,127 filed January 30, 1956 now Patent Number 2,925,650. In accordance with that disclosure, woven wire mesh is subjected to both mechanical compressing and sintering operations to flatten the wires in the mesh surfaces and, at the crossover points of the wires, to form enlarged contiguous areas, the latter being fused or bonded by the sintering operation. Wire mesh filtering surfaces of this type are useful over an extremely large range of temperatures, say from −65° to 600° F., the latter being the temperature which the hydraulic systems of aircraft and missiles can attain. While the invention of the copending application results in a filtering sheet per se which can be subjected to high temperatures as well as high pressures with excellent filtering action, the present invention is concerned with the integration of the basic filtering sheets into working filter assemblies or units in which the several joints and junctions are, like the porous sheet material itself, able to withstand extreme temperatures and pressures. A typical filter element 11 for the assembly of FIGURES 1 and 2 is made up of a 10 micron "Rigimesh," the trademark under which the product of said copending application is sold, sheet formed into corrugations 11a, 11b, 11c, 11d, etc., approximately .160 inches in depth and, so corrugated, bent into tubular form, in this case cylindrical, with an outside diameter of approximately 0.75 inches and joined where the two ends are brought together in a single welded seam 14, preferably formed by resistance welding. There are approximately 33 corrugations over the circumference of the filter element 11.

At its respective ends, the tubular filter element 11 is compressed or crimped across the depth of its corrugations to form dense, compacted end margins 15 and 16, respectively. The ends are compacted to a thickness usually not less than half the depth of the corrugations and to a point at which the density is approximately 35% or more of the density of the metal wires of which the filter sheet is fabricated. The compacted end 15 is fitted into the generally toroidal space between the radially opposed surfaces of a pair of concentric rings 17 and 18, and the end 16 is correspondingly fitted in the space between the opposed surfaces of a pair of concentric rings 19 and 20. The rings 17 and 18 and the end 15 of the filter element 11 are permanently joined by means of a continuous, circular weld 22, preferably of the Heliarc type.

The end piece 12 is formed with a circumferential notch 23 which receives the end sub-assembly comprised of the rings 17 and 18 and the end 15 of the filter element 11, and the two are joined by a circular weld 24. The end piece 12 is also formed with an axial opening 25 communicating with the inside surfaces of the tubular filter element 11. The other end sub-assembly includes the rings 19 and 20 embracing the compacted end 16 of the filter element, the three being welded together and received in and welded to the grooved end piece 13 which closes off the end of the filter element. The filter assembly 10 is completed by means of a gently compressed, steeply pitched coil spring 26 to buttress, in cases of extreme stress, the filter element 11, and by an overlying wire mesh sheet 27 wrapped about the filter element 11 and received at one end in a notched shoulder 28 in the end piece 13 and terminated at its other end by following the inwardly converging contour of the compressed end margin 15 of the filter element 11 to abut against the end surface of the ring 18. The overlying filter sheet 27 can, depending on the ultimate use to which the unit is to be put, have a pore size less than, equal to, or greater than, that of the filter element 11.

Preferably, all of the elements of the filter assembly 10 are formed of the same metal, or in any case of compatible, weldable metals of the same general coefficient of expansion. Various grades of stainless steel afford good results. In use, the filter assembly 10 is mounted in a hydraulic system with the liquid flow passing from the center of the tubular filter unit 11 radially outwardly. The nature of the wire mesh filter element is such that it is capable of withstanding a considerable pressure differential without other supporting or backing up members as part of the filter assembly. It will be observed that the end portions 12 and 13 are united only through the agency of the filter element. Also, it will be observed that the compressed ends are centered between the extreme amplitudes of the corrugations, that is to say the ends are compressed symmetrically.

Figure 3:
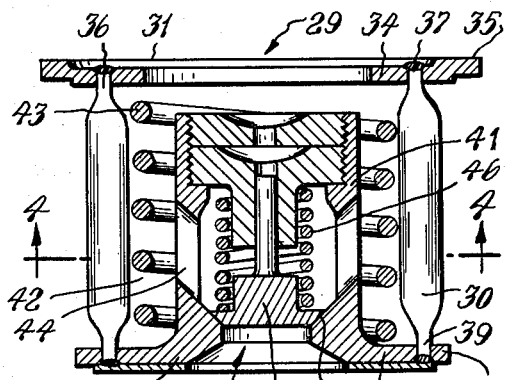
FIGURE 3 is a view in longitudinal section of a filter assembly in which a relief valve includes a body portion having an annular surface which forms one portion of a joint with the filter element.
Figure 4:
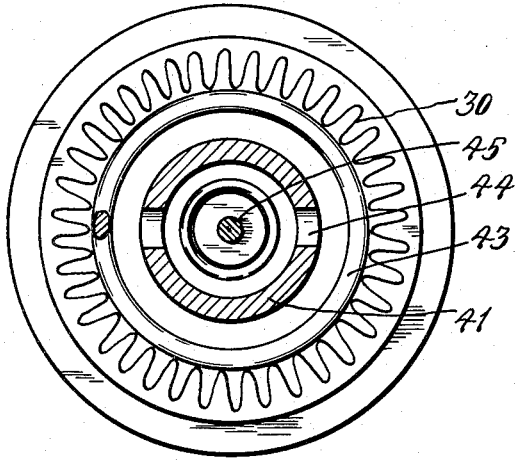
FIGURE 4 is a view in transverse section taken on the line 4—4 of FIGURE 3 looking in the direction of the arrows.

Referring to FIGURES 3 and 4, there is illustrated a filter assembly in which the flow direction is radially inwardly and which in addition includes an integrated relief valve assembly for by-passing the filter element in the event of clogging. The assembly, identified generally by the numeral 29, includes a filter element 30, corrugated longitudinally, and in tubular or cylindrical form as best seen in FIGURE 4, and which supports at one end an apertured end assembly 31 and at its other end an end assembly 32 which includes a poppet type relief valve indicated generally by the numeral 33. As in the arrangement of FIGURES 1 and 2, the filter element 30 comprises a woven wire mesh preferably formed in accordance with the said copending application Serial No. 562,127.

The end assembly 31 includes inner and outer ring elements 34 and 35, between the radially opposed surfaces of which is disposed the compressed or compacted end 36 of the filter element 30, the three elements being united by a weld 37. The end assembly 32 includes an outer ring 38 and, radially inwardly from the end 39 of the filter element 30, an inner ring 40 which is integral with the body portion 41 of the poppet valve 33. The valve body 41 is smaller than the inside diameter of the tubular filter element 30 and in the toroidal clearance space 42 therebetween is disposed a helical coil or spring element 43 having for its purpose to back up the filter element 30 against radial compression in the event of extreme stresses. The valve body is formed with side openings 44 communicating with the center space in which the valve element 45 is slidably mounted and urged by a spring 46 against a valve seat 47.

The assembly 29 is adapted to be mounted in a hydraulic system so that the fluid flow passes radially inwardly through the filter element 30 and out through the center of the ring 34 of the end assembly 31. Inlet pressure is also applied against the valve element 45 so that in the event the filter element 30 for any reason becomes partially or fully clogged, the valve can unseat and allow the free passage of fluid through the opening 44 in the valve body and outwardly through the center of the ring 34 at the end of the assembly.

Referring to FIGURES 5 and 6, there is shown a filter assembly designed for use as an in-line filter for hydraulic fluid for operation at pressures in the range of 1500 p.s.i. with a flow rate of approximately 1½ gallons per minute with a filtration efficiency of about 5 microns. The assembly, identified generally by the numeral 48, includes a thick-walled inlet housing or sleeve 49 having an inlet connection adapter 50 at one end and formed with internal threads 52 at its other end to receive an outlet connection adapter 52a which in turn supports at its inner end and in cantilever fashion a filter sub-assembly indicated generally by the numeral 53.

The filter sub-assembly 53 is mounted on a machined, tubular shank 54 which is formed integrally with the outlet connection adapter 52a, the machined shank 54 including a series of grooves 55 machined in its outer cylindrical surface. At the base of each groove at four equi-distant points about its circumference are holes 56 entering an axial throughbore 57 which comprises the outlet channel of the assembly.

Surrounding the shank and abutted against a shoulder 58 of a ring portion 59, formed integrally with the shank, is a cylindrical, uncorrugated single layer filter element 60 formed of woven wire mesh. Surrounding the filter element 60 is a second filter element 61 in the form of a corrugated, cylindrical woven wire mesh, the ends 62 and 63 of which are crimped or compressed to form dense edges. As can be seen in FIGURE 5, the compression of the edges 62 and 63 affords a flat inner surface along the length of the element 61 and coextensive with the maximum amplitude of the corrugations which extend inwardly. The flat end extends beyond the shoulder 58 to overlie the ring 59. The joint is completed by means of an outer ring 64, with the three elements 64, 63 and 59 being joined by a weld 65 in a liquid-tight seal. At its other end the filter element 61 and in particular its compressed end 62 is embraced by an outer ring 66 and, on its inner surface, by the single layer filter element 60, followed by an inner ring 67 formed integrally with the shank 54. The ring 66, the compressed end 62, the filter element 60, and the inner ring 67 are all integrated by a common large weld 68. The open end of the outlet channel 57 is closed by a cap plate 69 secured by a weld 70, for example, to the shank 54.

Fluid flows in the inlet connection adapter 50 and around the closed-off end of the filter sub-assembly 53 to pass, sequentially, through the corrugated filter element 61, the single layer filter element 60, the channels 55 and the holes 56 to the outlet channel 57. In this fashion, all of the fluid is forced through the filter element and any leakage which might occur through the threaded connection between the outlet connection adapter 52a and the body portion 49 of the unit is blocked by the sealing action of a O-ring 71.

Referring to FIGURE 7, the invention is illustrated as embodied in a fuel filter assembly indicated generally by the numeral 72. The assembly includes a central tubular portion 73 over which is fitted a one piece body portion 74 to rest at its lower end on a positioning shoulder 75 on the tubular member 73. Adjacent the shoulder 75 the lower edge of the body portion 74 meets a radially enlarged portion of the tubular member in a tight sliding connection which is sealed by an O-ring 76 so that the wall of the tubular portion 73 at its lower extremity and the surrounding wall of the lower portion of the body 74 define a closed sump space 77. Fitted between the tubular member 73 and the body portion 74 above the sump 77 is a filter sub-assembly indicated generally by the numeral 78 which rests at its lower end on a shoulder 79 formed on the inside wall of the body portion 74 approximately midway between the ends.

The filter sub-assembly 78 includes a filter element 80 in the form of a woven wire mesh, which is preferably treated in accordance with said copending application Serial No. 562,127 and formed into relatively deep corrugations, on the order of approximately ½ inch running axially of the unit and taking the general cylindrical or tubular form of the filter elements described above. The upper and lower ends 81 and 82 respectively of the filter element 80 are symmetrically compressed as by crimping. The lower end 82 is fitted between an outer ring 83 and an inner ring 84, the three being joined by a weld 85. Joined to the inner ring 84 is a holding and sealing flange 85a which is formed at its inner edge, radially speaking, with a sealing channel 86 carrying an O-ring 87 which bears tightly against a radially enlarged wall section 88 of the tubular portion 73. The upper end 81 of the filter element 80 is secured between a metal outer ring 89 and a metal inner ring 91 by a weld 91a. The inner ring carries a sealing flange 92 formed at its inner edge with a circular sealing channel 93 containing an O-ring 94 which bears in sealing relationship against a radially enlarged section 95 on the upper end of the center tubular portion 73.

The upper end of the center tubular portion 73 is also internally threaded to receive a cap assembly indicated generally by the numeral 96 having a depending outer flange 97 internally channeled to receive an O-ring 98 which bears against the outer wall of the body portion 74. The cap portion 96 includes an inlet opening 96a, an outlet opening 96b diametrically opposite thereto, and between the inlet and outlet openings is a central valve chamber 99 including a valve element 100 urged by a spring 101 against a valve seat 102.

In operation the influent flows in the opening 96a downwardly to a deflection slot 103 and down the inside surface of the wall of the body portion 74 along the length of the filter element 80, first filling the sump 77 and then forcing its way radially inwardly through the filter element 80 and through vertical slots 104 in the upper end of the tubular member 73 into the valve chamber 99 and through openings (not shown) in the spider 105 which supports the valve 100, into the outlet 96b.

Referring to FIGURES 8 and 9, there is shown a filter assembly including a magnetic trap useful for isolating fine metallic particles which might otherwise find their way through the filter element. The filter assembly, identified generally by the numeral 106, includes a filter element 107 in the form of a corrugated tubular member made of a woven wire mesh, preferably of the type described above, and compressed at its respective ends 108 and 109. The upper end 108 is disposed between an apertured inner ring 110 and a flanged outer ring 111, with a metallic weld 112 integrating the three metal parts. The other end 109 of the filter element is secured between inner and outer rings 113 and 114 respectively by a metallic weld 115, the inner ring 113 comprising a cap member sealing off the end of the filter element 107. The cap portion of the inner ring 113 includes a central outwardly directed lug 116.

Fitted within the filter element 107 is a compression member which can take the form of a spring 117 and disposed outside the filter element 107 is a magnetic assembly indicated generally by the numeral 118 of generally tubular shape abutted at one of its ends against the ring 111 inside a shoulder 111a formed thereon. At its other end the magnetic assembly 118 is engaged by a holding plate 119 which is centrally apertured to fit over the central lug 116 of the ring 113 and held in place by means, for example, of a conventional snap ring 120.

The magnetic assembly 118 includes a pair of tubular non-corrugated wire mesh elements 121 and 122 between which are fitted a series of elongated, laterally spaced apart magnetic bars 123 as best seen in FIGURE 9. The magnetized bars 123, which can be formed of Alnico V, are shaped on their inner and outer surfaces to conform to the generally cylindrical curvature of the embracing mesh portions 121 and 122 and they are polarized across their widths and arranged north pole to south pole around the filter elements. As best seen in FIGURE 8, the lower ends of the magnetic elements 123 terminate short of the holding plate 119 to form a space 124 within which is disposed a positioning boss 125 struck upwardly from the holding plate. In the spaces between adjacent magnetic bars 123 are fitted five-layer stacks 126 of woven wire mesh formed of magnetic material so that the ferromagnetic vertical strands running parallel to the edge surfaces of the magnetic bars become magnetized as shown in FIGURE 9B. To this end the stacks 126 of magnetic mesh are preferably formed with stainless steel wires running in the horizontal direction and soft iron wires in the vertical direction, each of the latter becoming magnetized across its diameter to form a myriad of magnets for attracting metal particles of magnetic material from the fluid which passes therethrough.

In operation, the assembly 106 is so mounted in a hydraulic system that fluid can pass radially inwardly through the stacks of magnetized mesh 126 through the filter element 107 and out through the opening in the ring 110. In mounting the assembly 106 a conical spring 127 is used to urge the assembly toward a receiving surface in the housing (not shown). A typical unit embodying the construction of FIGURES 8 and 9 has a mechanical filter component removal rating of 17 microns and a magnetic component rating of 2 microns with a flow rate of approximately 5 gallons per minute. All of the configurations described herein should, after assembly, be subjected to the "Bubble Point Test" described in copending application, Serial No. 625,444, filed November 30, 1956. Any holes larger than the desired maximum value which show up during the bubble point test should be repaired by application of a liquid or paste resinous material, or by other suitable means, to the area at which the bubble appears. After the applied sealing material has been set, by heating or other means, the filter element may be rechecked by the bubble point method to verify that it has no holes larger than the predetermined maximum. The sealant material used must be one which is compatible with the conditions of use. Sealants used include synthetic resins, glasses and glass-like materials, hard or soft solder, welding, and sprayed-on metal coatings.

While representative embodiments of the invention have been illustrated in the accompanying drawings and described in the specification, it will be understood that the invention can take other specific forms and arrangements. Thus, the filter elements, which are shown as being generally cylindrical in the illustrated embodiment, can range between the cylindrical shapes shown and a substantially flat, disc shape, including all intervening stages of conical shape. In general, in order to effect a sound, welded joint between the mesh material and the ring assemblies it is essential that the corrugated metal be crimped to compact or densify the end portions to achieve a density of material which is not less than 35% of the density of the metal of which the wire making up the mesh is made. Also, the depth of the corrugations in relation to their spacing should be correlated with the fiber stress of the wires of which the mesh is made. For a range of corrugation depths of say .075 to .750 inch, which is a useful range for most applications, the thickness of the mesh material should range correspondingly from .006 to .012 inch, the latter being a more open weave. Accordingly, the invention should not be regarded as limited except as defined in the following claims.

I claim:

1. A process for forming a tubular filter element formed of metallic wire mesh sheet comprised of relatively fine wire and adapted for mounting in a filter assembly which comprises forming corrugations in a metallic wire mesh sheet, forming the corrugated sheet into a generally tubular configuration conforming to that of the ultimate filter element, compressing the ends of the tube to form substantially uniformly dense ends free of corrugations, positioned between the amplitudes of the corrugations, and having a density of at least 35% of the density of the metal wires comprising the mesh sheet, fitting a pair of concentric rings each adapted to connect the filter element to the filter assembly over the compressed and densified ends of the tube, and welding the compressed ends and contiguous portions of the rings to the inner and outer surfaces of the ends to form an integrated metallic bonded tubular metal filter.

2. A process in accordance with claim 1 in which the step of compressing and densifying the ends of the corrugated metal sheet is performed before the corrugated metal sheet is formed into a generally tubular configuration.

3. A process in accordance with claim 1 which includes attaching a cap to close off one of the open ends of the filter element.

4. A process in accordance with claim 3 in which the wire mesh is a sinter bonded woven wire mesh.

5. A process in accordance with claim 1 which comprises displacing a helical coil within the tube to back up the filter element against radial compression.

References Cited in the file of this patent

UNITED STATES PATENTS

| | | |
|---|---|---|
| 1,218,154 | Zahm | Mar. 6, 1917 |
| 1,303,438 | Wiehl et al. | May 13, 1919 |
| 1,462,474 | Atkinson | July 24, 1923 |
| 2,145,535 | Vokes | Jan. 31, 1939 |
| 2,279,423 | Vokes | Apr. 14, 1942 |
| 2,450,339 | Hensel | Sept. 28, 1948 |
| 2,457,051 | LeClair | Dec. 21, 1948 |
| 2,721,659 | Turcotte | Oct. 25, 1955 |
| 2,767,845 | Codlin | Oct. 23, 1956 |